INVENTOR.
RICHARD TAYLOR

INVENTOR.
RICHARD TAYLOR
BY
P.E. Henninger

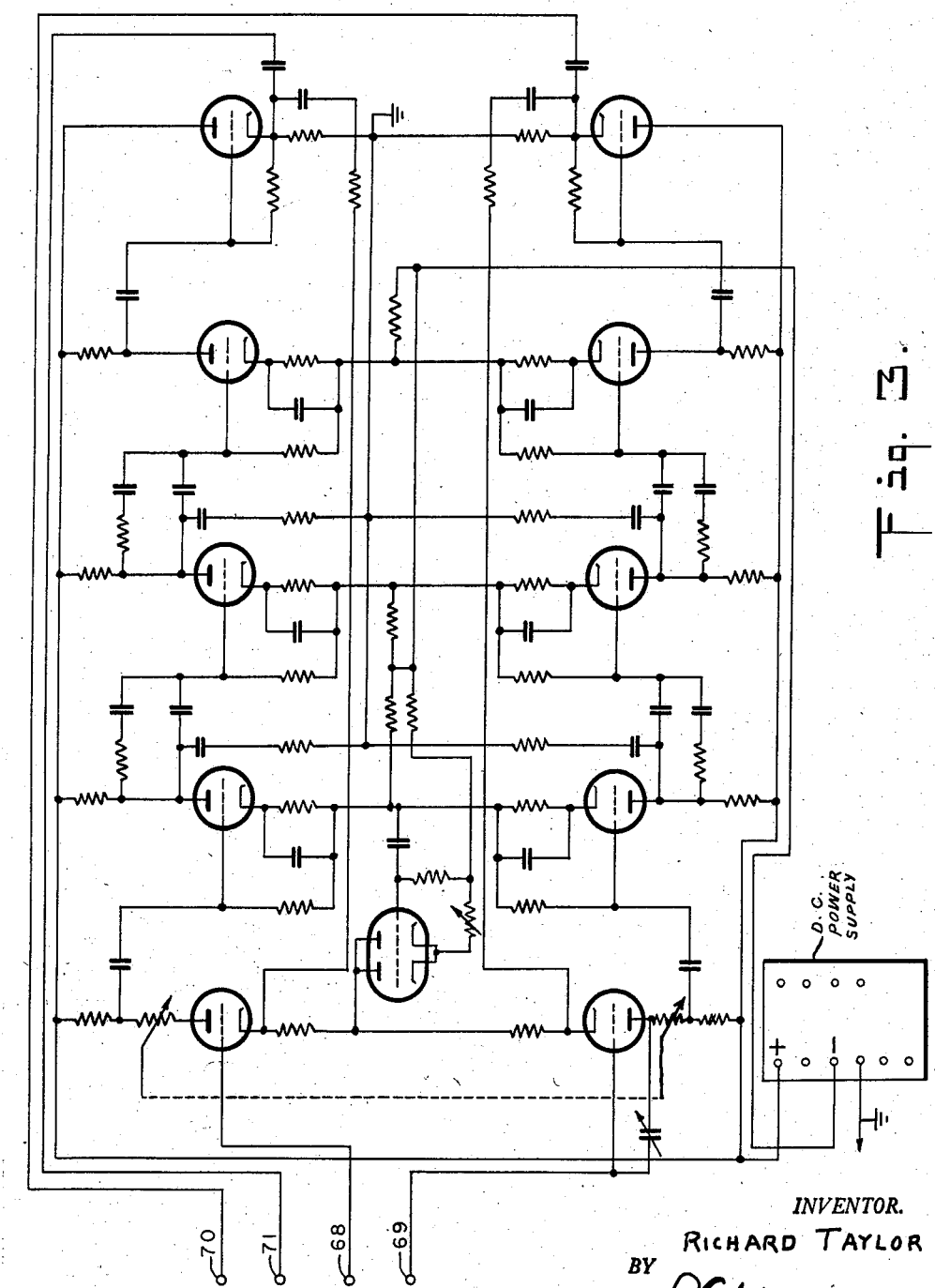

United States Patent Office 2,886,702
Patented May 12, 1959

2,886,702

ALTERNATING CURRENT ERROR DETECTOR SYSTEM

Richard Taylor, Binghamton, N.Y., assignor to International Business Machines Corporation, New York, N.Y., a corporation of New York Application December 29, 1954, Serial No. 478,441

9 Claims. (Cl. 250—27)

This invention is concerned with an A.C. signal comparison network. More specifically the invention includes a signal comparison network which is particularly adapted for determining an error or difference between two given A.C. signals. Also included in the system there is a phase correction means for insuring that both A.C. signals, that are to be compared, are accurately in phase.

When A.C. signals are compared, most especially when a difference is to be determined between the amplitudes of such signals, it is important that both signals have an identical phase. If either signal is out of phase with the other, a comparison will not be valid in indicating a true amplitude difference. Furthermore, out-of-phase components of A.C. signals that are being compared when a balanced amplifier is employed, will create saturation effects in the balanced amplifier which would cause the results to be inaccurate.

While there are many different applications in which a comparison system according to this invention might be employed, one specific example is that described in connection with a copending application by Messrs. Taylor, Strael and Sanchirico, Serial No. 479,104, filed December 31, 1954. Numerous other applications will suggest themselves to one skilled in the art.

Consequently it is an object of this invention to provide an A.C. error detector for comparing two A.C. signals which includes a phase correction in order to rotate one of the signals into the same phase as the other without altering the amplitude thereof.

Briefly, the invention includes an A.C. error detection system for comparing two A.C. signals, such A.C. signals being ones having a difference in phase. The system comprising a balanced differential amplifier having two inputs for receiving said signals. The system further includes a summation element in series with one of said inputs for shifting the phase of that input signal to agree with the phase of the other input signal. In addition, the system includes means for applying a phase-correcting signal to said summation element under control of the output of said balanced differential amplifier, and the output of said balanced differential amplifier represents the true error after the phase correction has been effectuated.

These and other objects including various principles and novel aspects of the invention are shown and described more fully below in connection with one embodiment thereof, and are illustrated in the drawings, in which:

Fig. 3 is a circuit diagram illustrating a balanced differential amplifier which may be employed in the system.

In comparing two A.C. signals, where the amplitude of the difference of their magnitudes only is the desired quantity to be determined, the two signals must be exactly in phase in order to get a valid comparison. Hence the comparison system according to this invention includes means for rotating the vector representing one signal into phase with the vector representing the other signal.

Figures 1, 4, 5:
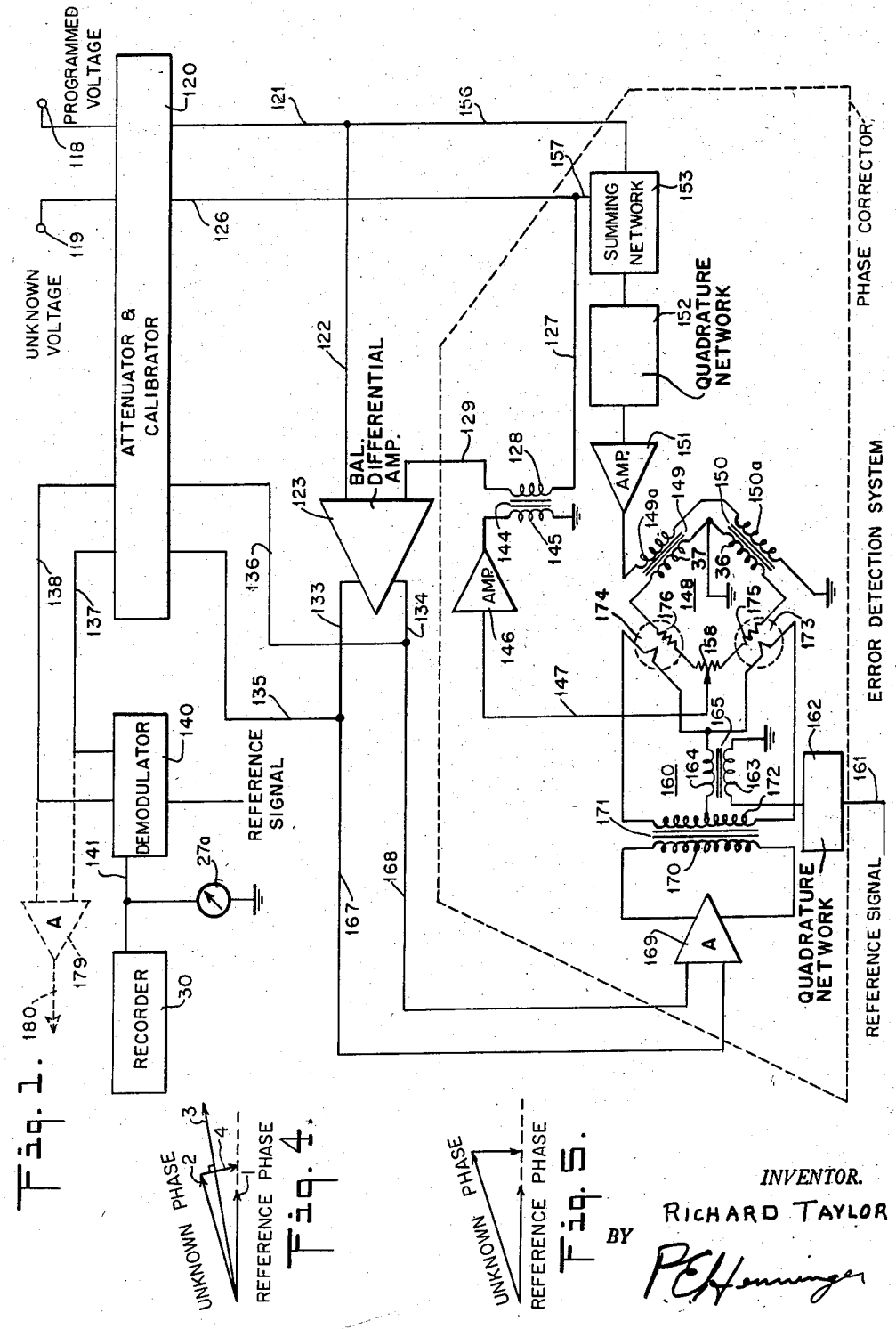
Fig. 1 is a schematic block diagram illustrating an error detector according to this invention.
Figs. 4 and 5 illustrate two types of comparisons which may be made with a system according to this invention.

A vector diagram illustrating this vector rotation is shown in Fig. 4, where a reference phase signal 1 is represented as a vector which may be considered as the reference phase by reason of its having been generated as a known voltage, in both amplitude and phase, by some convenient means such as a programmed control. An unknown voltage signal 2 is represented as another vector which has a phase different from that of the reference phase. Now by taking the sum of these two vectors 1 and 2, a vector 3 is obtained, and a voltage in quadrature relation to this vector 3 may be derived therefrom. A vector 4 of Fig. 4 represents such a quadrature voltage, and by approximately selecting the magnitude of the vector voltage 4 and adding vector 4 to the unknown signal vector 2 the resultant will be a rotation of the vector 2 into phase with the known signal vector 1 without significantly modifying the amplitude of the vector 2. The rotation of vector 2 into phase agreement with vector 1 is accomplished with an insignificant change in its magnitude, insofar as system accuracy is concerned, when the angle of rotation is only a few degrees as in the present case. Thus the two signals may now be compared in a balanced differential amplifier and the resulting output signal accurately represents the difference in amplitude between the signals. As used throughout the present description, the term "balanced differential amplifier" connotes an amplifier used to amplify substantially only the difference of the in-phase amplitude components of two signals that are applied to individual ones of two input circuits of the amplifier. The balanced differential amplifier will, in amplifying such amplitude differential between these two signals, at the same time be highly nonresponsive to so much of the in-phase signal amplitude components as are equal. If the two applied signals have a phase difference between them, the quadrature component of one signal as referred to the other signal is also amplified by the amplifier while preserving the identity of the relative lagging or leading phase angle difference.

Referring to Fig. 1, a system for comparing two A.C. signals is shown. In accordance with the above explanation, the two signals to be compared may be referred to as a "Programmed Voltage" and an "Unknown Voltage."

It will be noted that the programmed voltage input terminal 118 will have a signal such as that represented by the vector 1 described above, introduced thereat, while the unknown voltage terminal 119 will have the other signal such as that represented by the vector 2 applied thereto. There is an attenuator and calibration network 120 illustrated by a box. The details of this element 120 are not material to this invention, and may be supplied by one skilled in the art. Any conventional circuitry for obtaining desired attenuation and calibration effects may be employed. The predicted programmed voltage as adjusted by the network 120 is then fed over a wire 121 and a wire 122 to one input of a balanced differential amplifier 123. It is to be noted that no attenuation will take place when the maximum sensitivity of error detection is desired.

The signal introduced at terminal 119, after passing through the attenuator and calibration network 120, is fed over a wire 126 and another wire 127 to a transformer winding 128 and then via a wire 129 to the other input to the balanced differential amplifier 123. Difference signals are fed out from the balanced differential amplifier 123 over wires 133 and 134 to wires 135 and 136, respectively, which feed the difference signal via another section of the attenuator network 120 and via wires 137 and 138 to a demodulator 140 where the comparison or difference signal is demodulated and fed via a wire 141 to a recorder 30, and a visual display element 27a. The visual display element may be a D.C. voltmeter, or the like, as indicated in Fig. 1. It will be noted that the demodulator 140 is a well-known device for transforming an A.C. signal to D.C., and any conventional demodulator having the necessary circuit constants may be employed in the error detector circuit of this invention.

In order to avoid erroneous output signal readings from the signal comparison circuit just described above, it is necessary to make adjustments in order to insure that the voltage, as introduced at terminal 119, is exactly in phase at the differential amplifier 123 with the reference voltage with which it is being compared. To accomplish this, the elements now to be described are employed. The transformer winding 128 is an element for introducing corrections as necessary to adjust the phase of the unknown signal before it is fed into the input of the balanced differential amplifier. The superposing, or adding, of signals in the winding 128 for effecting such adjustment is accomplished by the use of a transformer 144 having another winding 145 inductively related to the winding 128. Signals are fed through the winding 145 from an amplifier 146 that receives its input signals via a wire 147, which carries the output signal from a bridge 148, which in turn receives its input or excitation from a pair of transformers 149 and 150. The input or excitation signal to the bridge 148 is introduced via primary windings 149a and 150a, respectively, of transformers 149 and 150. Windings 149a and 150a are connected in series and carry the output signals from an amplifier 151, which is fed from a quadrature network 152, which in turn is fed from a summing network 153. The input to the summing network 153 is the two signals being compared, i.e. the programmed or reference signal from terminal 118, over wire 121 and a wire 156 to the summing network 153; while the signal from terminal 119 is fed via the wire 126 and a wire 157, to the summing network 153.

Thus, the quadrature component of a combined or summation signal of the two signals being compared (without any correction of the phase of the unknown voltage) is fed into, as the excitation signal for, the bridge 148. And, whenever this bridge is unbalanced, an output signal from bridge 148 will be fed over the wire 147 to the amplifier 146 and through the transformer winding 145 so as to superpose a correction (by means of transformer winding 128) on to the unknown computer signal from terminal 119, to adjust the phase thereof as required. It will be noted that there is a potentiometer 158 in connection with the bridge 148 for the purpose of making initial zero balance adjustments in the bridge.

Figure 2:
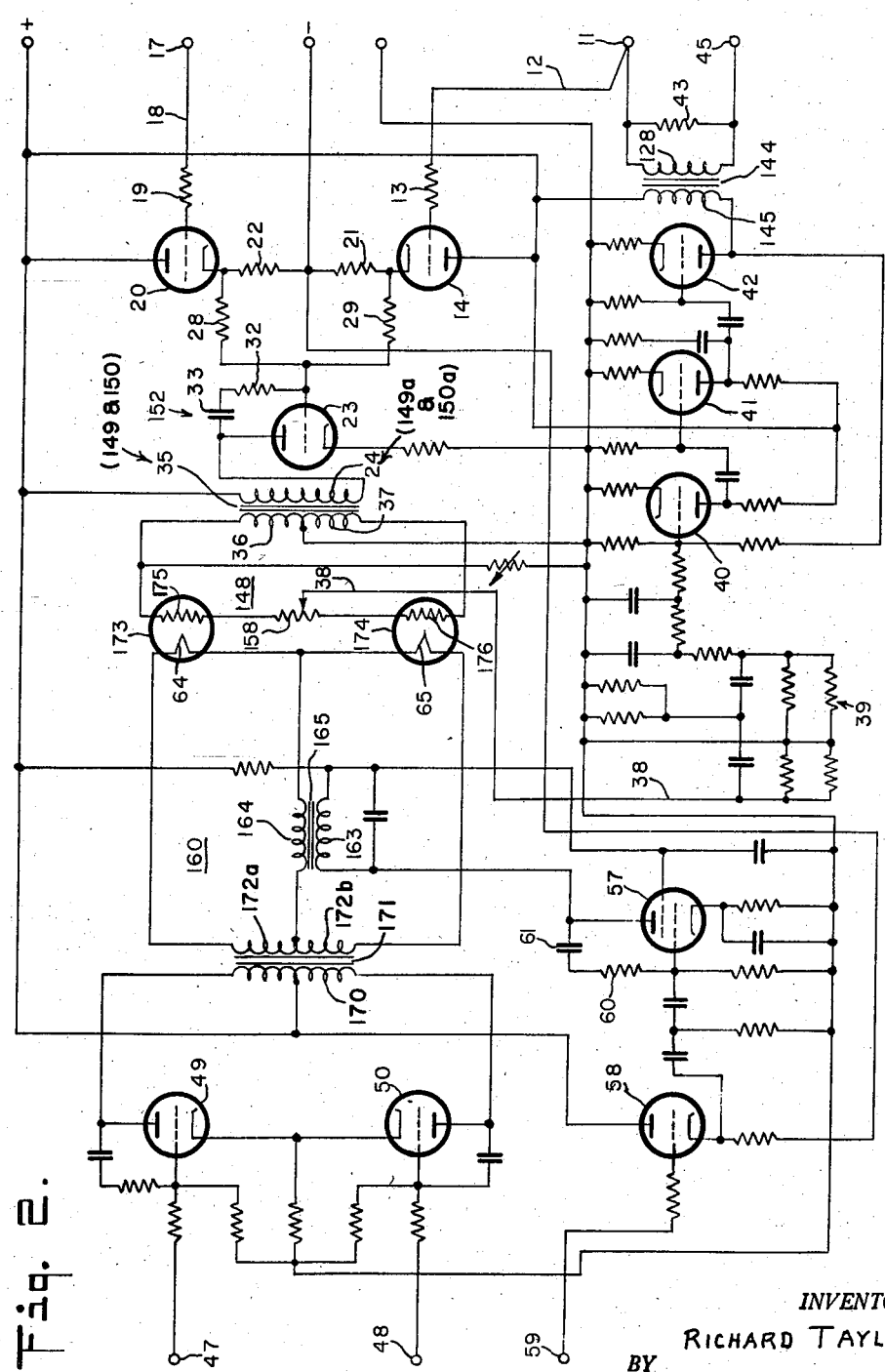
Fig. 2 is a more detailed circuit diagram illustrating the phase corrector portion of the error detector.

In order to determine when a phase correction is necessary for the computer signal, there is a closed loop circuit that includes another bridge 160. The bridge 160 has fed across one of its diagonals a quadrature reference signal that is obtained from a reference signal introduced as indicated, over a wire 161. In order to detect any quadrature component in the combined unknown and programmed signals, the reference signal is rotated by ninety electrical degrees by a quadrature network 162, from which it is fed over the illustrated circuit through a primary winding 163 of a transformer 165. A secondary winding 164 of transformer 165 is connected across a diagonal of the bridge 160 as illustrated. The quadrature networks 152 and 162 are well known elements for shifting the phase of a signal passing therethrough, ninety electrical degrees. Specific networks that may be employed in the circuit are illustrated in Fig. 2. It is to be noted that the reference signal is derived from the source employed in generating the programmed signals, so that the programmed signals are exactly in phase therewith.

The other input to the bridge 160 is a signal as obtained from the output of the balanced differential amplifier 123 and fed over the wires 133 and 134 to wires 167 and 168, respectively, which lead to an amplifier 169. The output of amplifier 169 is fed to a primary winding 170 of a transformer 171. The secondary of transformer 171 has a center-tapped winding 172, the two halves of which constitute two of the legs of the bridge 160. The other two legs of the bridge 160 are constituted by the heating elements of a pair of thermal devices 173 and 174. It will be noted that the thermal devices 173 and 174 have thermally varied resistance elements 175 and 176, respectively. These thermally varied resistance elements constitute two of the legs of the bridge 148. One type of thermal element which may be employed is that known as a "thermistor" in the trade.

The operation of the phase correction aspect of this error detection system involves a feedback loop that creates the necessary phase adjustment by reason of any out-of-phase condition present in the unknown signal as introduced at the terminal 119. This correction effect may be traced by following the combined signals that are being compared. First, the individual signals are fed into the balanced differential amplifier 123, the unknown signal going via transformer winding 128. Next, it will be noted that the combined summation signal of these two signals is fed into the summing network 153 and through the quadrature network 152, in order to produce a quadrature excitation signal into the bridge 148 that is derived from the summation signal of the unknown voltage and the programmed voltage before any correction is applied to the unknown voltage phase. Now, whenever the unknown signal is out of phase with the reference signal, a quadrature component will be present in the difference or output signal from the balanced differential amplifier 123. This difference signal is constituted by the resultant of a quadrature component and a component in phase with the programmed voltage signal, so that the phase angle of the difference signal varies with the magnitude of the quadrature component. Therefore this difference signal which is fed into the bridge 160 via the amplifier 169 and the illustrated circuit, will cause the bridge 160 to be unbalanced. This is because any quadrature component in the difference signal, as fed via winding 170 of transformer 171 to winding 172, will create an unbalanced condition in the bridge 160 by adding vectorially to the quadrature reference signal flowing through one half of the bridge 160 to give a resultant signal of different magnitude than that produced by the vectorial addition to the same quadrature reference signal flowing through the other half of the bridge, the bridge 160 being energized by the diagonally connected transformer having secondary winding 164.

Consequently, such unbalance will create unequal heating effects on the thermal elements 173 and 174, which in turn will vary the resistance of thermal resistances 175 and 176 so that they are unequal and thus the bridge 148 will be unbalanced. When the bridge 148 is unbalanced, it will produce an output signal that is fed via the wire 147 and the amplifier 146, to be fed through the winding 145 of the transformer 144. In this manner a correction signal is superposed on the unknown output signal (in winding 128 of the transformer 144) which will adjust the phase thereof to match the phase of the programmed signal. In this manner the out-of-phase condition of the unknown signal as evidenced by a quadrature component in the output of the differential amplifier 123 will be employed so as to constantly adjust this signal as necessary by rotating its vector to be in phase with the programmed signal, for an accurate comparison therewith.

In Fig. 2, a detailed circuit for the phase corrector portion of the system is shown. The operation of the elements in this circuit will be clear from the above description. However, in connection with the operation including the detailed elements shown in Fig. 2, such operation will be made clear by following a signal through this circuit. The unknown signal voltage will be introduced at a terminal 11 and will be connected via a wire 12 and a resistor 13 to the grid of a tube 14. At the same time the other signal which is to be compared with the unknown voltage is introduced at a terminal 17 and is carried via a wire 18 and a resistor 19 to a tube 20. The tubes 14 and 20 together constitute elements of the summing network 153 illustrated in Fig. 1. It will be observed that there are cathode resistors 21 and 22 in series with each of the tubes 14 and 20 respectively. The two signals as introduced at terminals 11 and 17 are therefore summed to create a single signal that is produced across resistors 21 and 22 together, and carried to the quadrature network 152 which acts in conjunction with an amplifier tube 23 that has its plate in circuit with a transformer winding 24 (corresponding to primary windings 149a and 150a of Fig. 1). It will be observed that the summation signal is carried from the tubes 14 and 20 via a pair of resistors 28 and 29 which are each connected at one end thereof to the cathodes of the tubes 20 and 14 respectively. The other ends of resistors 28 and 29 are connected together and also to the grid of tube 23.

In order to quadraturize this summation signal there is a resistor 32 having one end connected to the grid of the tube 23 and the other end connected to a series condenser 33. Condenser 33 has its other electrode connected to the plate of tube 23. In this manner the quadrature of the summation signal is applied to the winding 24 of a transformer 35. It will be noted that the transformer 35 is the equivalent of the element that is illustrated in Fig. 1 as two separate transformers 149 and 150.

In this manner the summation signal having been quadraturized, or rotated 90°, is then introduced across two adjacent legs 36 and 37 of the bridge 148 which includes the two halves of secondary winding for the transformer 35 (transformers 149 and 150 together). The other two legs of the bridge 148 are made up of the resistors 175 and 176 which are thermally sensitive resistors as described above. The remainder of the bridge 148 will be clearly recognized as including the adjustment resistor 158. The output connection for the bridge is taken across one diagonal of the bridge, and includes a wire 38 which corresponds to the wire 147 of the more schematic diagram illustrated in Fig. 1.

When the bridge 148 is unbalanced, an output signal therefrom is transmitted via the wire 38 to a filter network 39, the output of which leads to the grid of a first amplifier tube 40. The signal is then amplified via two additional stages involving tubes 41 and 42, and the output is carried through the winding 145 of the transformer 144. The function of transformer 144 was described above in connection with the rotation of the unknown signal vector into phase with the programmed vector by adding the quadrature of the summation signal. It is pointed out that the transformer 144 has another winding 128 that may include a resistor 43 thereacross.

It will be noted that the signal introduced at terminal 11 has an additional path to that just described above which includes the winding 128 of the transformer 144, and which leads to a terminal 45 that will be connected to one of the inputs for the balanced differential amplifier 123 (Fig. 1).

The circuit for controlling the unbalance of the bridge 148 includes an amplifier having two input terminals 47 and 48, which have the output of the balanced differential amplifier 123 (Fig. 1) connected thereto. This amplifier corresponds to the amplifier 169 shown in block form in Fig. 1 and includes two tubes 49 and 50. The output of this amplifier is fed to the primary winding 170 of the transformer 171. The primary winding 170 has a center-tapped connection merely for the purpose of supplying plate voltage to the tubes 49 and 50.

The secondary winding of transformer 171 is center-tapped to be divided into two windings 172a and 172b which comprise the adjacent legs of the bridge 160, which legs were illustrated in Fig. 1 as center-tapped secondary winding 172. The bridge 160 also includes the input transformer 165 that has its secondary winding 164 connected across the diagonal of the bridge 160. Furthermore, the primary winding 163 of the transformer 165 is connected to the output of a quadrature network that was illustrated in block form in Fig. 1, and that includes, as shown in Fig. 2, amplifier tubes 57 and 58. The amplifier tube 58 has its input connected to a terminal 59 to which is connected a reference signal which has the same phase as the known, or programmed one, of the signals that are being compared.

It will now be clear to one skilled in the art that the reference signal as introduced at the terminal 59 will be ampified by the tube 58 and carried via a cathode follower circuit as illustrated, to the tube 57 where it will be quadraturized by means of a resistor 60 and condenser 61 in a manner similar to the quadrature network 152 described above, that included similar resistance and capacitive elements in connection with the amplifier tube 23.

When the output signals from the balanced differential amplifier 123 (Fig. 1) are introduced to the terminals 47 and 48 (Fig. 2), they are amplified and passed on to be introduced across the adjacent legs or windings 172a and 172b of the bridge 160. If these output signals as thus introduced across the bridge 160 have any quadrature component, such component will add to the reference signal (as fed across the diagonal of bridge 160) over one half of the bridge, and subtract from the same reference signal over the other half of the bridge. Therefore, the bridge 160 will become unbalanced. Such unbalance will create a difference in the relative amount of heating of both elements 64 and 65, that are the heater elements included in the thermally sensitive resistor elements 173 and 174 which were shown and described above in connection with Fig. 1. Thus the bridge 148 will be unbalanced to produce an output signal for correcting the phase of the unknown signal in the manner described above.

Fig. 3 shows a circuit that may be employed as the balanced differential amplifier 123 shown in block form in Fig. 1. Such a balanced differential amplifier, which will produce a differential output from two input signals, is not new per se, and the details of the operation of this amplifier need not be discussed here. It will be observed that input terminals 68 and 69 (Fig. 3) correspond to the inputs for the balanced differential amplifier 123 as fed via the wires 122 and 129 (Fig. 1). It will be appreciated by reference to the schematic diagram of Fig. 1, that terminals 68 and 69 (Fig. 3) will be connected to terminals 45 and 17 of Fig. 2. Likewise, a pair of output terminals 70 and 71 (Fig. 3) will be connected to the input terminals 47 and 48 of Fig. 2. This will carry the balanced differential amplifier output into the amplifier that includes tubes 49 and 50 which feed one input to the bridge 160.

It is pointed out that a system according to this invention may readily be employed to compare only the in-phase component of an unknown voltage, with a given signal voltage. Such a comparison is illustrated by the vector diagram shown in Fig. 5 as distinguished from the comparison of the two voltages so far described (by rotating one of the two voltages into phase with the other without changing the amplitude thereof), which action is graphically illustrated by means of vectors in Fig. 4.

To accomplish the comparison in the manner illustrated in Fig. 5, whereby the inphase component of one voltage is to be compared with another voltage, the system generally will operate in the same manner as described above, but some minor changes will be necessary. These changes will readily be appreciated by reference to Fig. 1 where it may be observed that the summing network 153 will be omitted and consequently the wires 156 and 157 likewise will be omitted. Thus, one of the two signals to be compared will be fed directly to the balanced differential amplifier 123 alone, while the other of these two signals will be fed to the other input of the balanced differential amplifier 123 via the winding 128 of the transformer 144 as before. Now, in order to obtain only the in-phase component of the voltage which is being fed via winding 128 of the transformer 144, a reference signal, i.e. one that is in phase with the voltage which is directly connected to balanced differential amplifier 123 alone, will be fed into the quadrature network 152. Consequently, the bridge 148 will be excited by a quadrature voltage that is 90° relatively out-of-phase with the programmed input voltage to be compared, and the remainder of the circuit for the phase correction portion as well as for the entire error detection system, will remain the same. Therefore, by reason of the action in connection with the feeding of the output of the balanced differential amplifier 123 to the bridge 160 and thereby unbalancing the bridge 148 (when quadrature components are present) the voltage which is fed to the balanced differential amplifier 123 via the transformer 144 will be rotated into phase with the known input voltage. But only the in-phase component of the unknown signal rather than the full amplitude of this unknown signal, will be passed on after the action of the addition of voltages in the transformer 144. Therefore, in this instance, the error signal output will be a measure of the difference between the given voltage and only the in-phase component of the compared voltage.

While certain embodiments of the invention have been disclosed in considerable detail in accordance with the applicable statutes, this is not to be taken as in any way limiting the invention, but merely as being descriptive thereof.

It is claimed:

1. An alternating current error detection system for comparing the amplitudes of two alternating current signals having a difference in phase comprising a balanced differential amplifier having push-pull connected repeater devices with individual and independent input circuits for receiving individual ones of said signals and having a common output load impedance included in common in the input circuits of both of said devices to effect substantial reduction in the signal repeating ratios of both of said devices for the condition that said input signals are in phase and have equal amplitudes, a signal summation element in series with one of said inputs for shifting the phase of that input signal to be in phase with the other input signal, and means responsive to the output of said balanced differential amplifier for controlling said summation element to minimize the phase difference between said signals, the output of said balanced differential amplifier representing the true error after the phase correction has been effectuated.

2. An alternating current error detection system for comparing the amplitudes of two alternating current signals having a difference in phase comprising a balanced differential amplifier having push-pull connected repeater devices with individual and independent input circuits for receiving individual ones of said signals and having a common output load impedance included in common in the input circuits of both of said devices to effect substantial reduction in the signal repeating ratios of both of said devices for the condition that said input signals are in phase and have equal amplitudes, a transformer having one winding in series with one of said inputs for shifting the phase of that input signal to be in phase with the other input signal, and means responsive to the out-of-phase component of the output of said differential amplifier for generating and applying to another winding of said transformer a phase correcting signal effective to minimize the phase difference between said input signals, the final output of said balanced differential amplifier representing the true error after the phase correction has been effectuated.

3. An alternating current error detection system for comparing the amplitudes of two alternating current signals having a difference in phase comprising a balanced differential amplifier having push-pull connected repeater devices with individual and independent input circuits for receiving individual ones of said signals and having a common output load impedance included in common in the input circuits of both of said devices to effect substantial reduction in the signal repeating ratios of both of said devices for the condition that said input signals are in phase and have equal amplitudes, a transformer having one winding in series with one of said inputs for shifting the phase of that input signal to be in phase with the other input signal, and means including electrical bridge means for comparing the phase of the output of said balanced amplifier with a reference phase signal to generate and apply to another winding of said transformer a phase correcting signal effective to minimize the phase difference between said input signals, the corrected output of said balanced differential amplifier representing the true error after the phase correction has been effectuated.

4. An alternating current error detection system for comparing the amplitudes of two alternating current signals having a difference in phase comprising a balanced differential amplifier having push-pull connected repeater devices with individual and independent input circuits for receiving individual ones of said signals and having a common output load impedance included in common in the input circuits of both of said devices to effect substantial reduction in the signal repeating ratios of both of said devices for the condition that said input signals are in phase and have equal amplitudes, a transformer having one winding in series with one of said inputs for shifting the phase of that input signal to be in phase with the other input signal, means including a phase comparison network for comparing the phase of the output of said balanced amplifier with a reference phase signal, and means responsive to the comparison by said network for generating and applying to another winding of said transformer a phase correcting signal effective to minimize the phase difference between said input signals, the output of said balanced differential amplifier representing the true error after the phase correction has been effectuated.

5. An alternating current error detection system for comparing the amplitudes of two alternating current signals having a difference in phase comprising a balanced differential amplifier having two inputs for receiving said signals, a transformer having one winding in series with one of said inputs for shifting the phase of that input signal to agree with the phase of the other input signal, means for applying a phase correcting signal to another winding of said transformer, said last-named means including a first bridge for comparing the phase of the output of said balanced amplifier with a reference phase voltage, a second bridge having a quadraturized excitation input and an output connected to said other transformer winding, and means for unbalancing said second bridge when said first bridge is unbalanced in order to correct the phase of said one input signal to agree with that of the other input signal and the reference voltage, the output of said balanced differential amplifier representing the true error after the phase correction has been effectuated.

6. An alternating current error detection system for comparing the amplitudes of two alternating current signals having a difference in phase comprising a balanced differential amplifier having two inputs for receiving said signals, a transformer having one winding in series with one of said inputs for shifting the phase of that input signal to agree with the phase of the other input signal, means for applying a phase correcting signal to another winding of said transformer, said last-named means including a first bridge for comparing the phase of the output of said balanced amplifier with a reference phase voltage, a second bridge having an excitation input derived from the quadrature of the sum of said two alternating current signals and an output connected to said other transformer winding, and means for unbalancing said second bridge when said first bridge is unbalanced in order to correct the phase of said one input signal to agree with that of the other input signal and the reference voltage, the output of said balanced differential amplifier representing the true error after the phase correction has been effectuated.

7. An alternating current error detection system for comparing the amplitudes of two alternating current signals having a difference in phase comprising a balanced differential amplifier having two inputs for receiving said signals, a transformer having one winding in series with one of said inputs for shifting the phase of that input signal to agree with the phase of the other input signal, means for applying a phase correcting signal to another winding of said transformer, said last-named means including a first bridge for comparing the phase of the output of said balanced amplifier with a reference phase voltage, a second bridge having an excitation input derived from the quadrature of said reference phase voltage and an output connected to said other transformer winding and means for unbalancing said second bridge when said first bridge is unbalanced in order to correct the phase of said one input signal to agree with that of the other input signal and the reference voltage, the output of said balanced differential amplifier representing the true error after the phase correction has been effectuated.

8. An alternating current error detection system for comparing the amplitudes of two alternating current signals having a difference in phase comprising a balanced differential amplifier having two inputs for receiving said signals, a transformer having one winding in series with one of said inputs for shifting the phase of that input signal to agree with the phase of the other input signal, and means for applying a phase correcting signal to another winding of said transformer, said last-named means including a first bridge for comparing the phase of the output of said balanced amplifier with a reference phase voltage, said first bridge including heating elements of thermally controlled variable resistors located on opposite sides of the bridge, a second bridge having a quadraturized excitation input and an output connected to said other transformer winding, said second bridge having said thermally controlled variable resistors located on opposite sides of the second bridge so that unbalance of said first bridge will unbalance said second bridge in order to apply a signal to said other transformer winding that will combine with the one input signal and bring the phase of the resultant to agree with the phase of the other input signal.

9. An alternating current signal comparison system for comparing a signal having a variable phase with a signal having a given phase comprising amplitude differential comparison means having push-pull connected repeater devices providing a balanced output circuit and two individual and independent input circuits for receiving in one thereof said signal of given phase and providing a common output load impedance included in common in the input circuits of both of said devices to effect substantial reduction in the signal repeating ratio of both of said devices under the condition that the signal supplied to both of said input circuits are in phase and have equal amplitudes, circuit means in series with the other of said input circuits for obtaining and applying thereto a signal functionally related to said variable phase signal but in phase with said given phase signal, feedback circuit means connected to said differential output circuit and including means for detecting an out-of-phase component in the output signal from the differential comparison means relative to said given phase, and means controlled by said out-of-phase component for applying a signal to said series circuit means, said last-named signal having a predetermined phase relation relative to said given phase in order to add to said variable phase signal in said series circuit means to obtain said in phase signal.

References Cited in the file of this patent

UNITED STATES PATENTS

| | | |
|---|---|---|
| 2,501,583 | Schafer | Mar. 21, 1950 |
| 2,568,250 | O'Brien | Sept. 18, 1951 |
| 2,577,668 | Wilmotte et al. | Dec. 4, 1951 |
| 2,622,236 | White | Dec. 16, 1952 |
| 2,680,193 | Noxon et al. | June 1, 1954 |
| 2,697,808 | MacNichol et al. | Dec. 31, 1954 |
| 2,729,772 | Perkins | Jan. 3, 1956 |
| 2,788,441 | Zimmerli | Apr. 9, 1957 |
| 2,808,550 | Carney | Oct. 1, 1957 |